June 9, 1931.    W. M. HEINA    1,809,296
PORTABLE RADIO APPARATUS
Filed Feb. 9, 1928
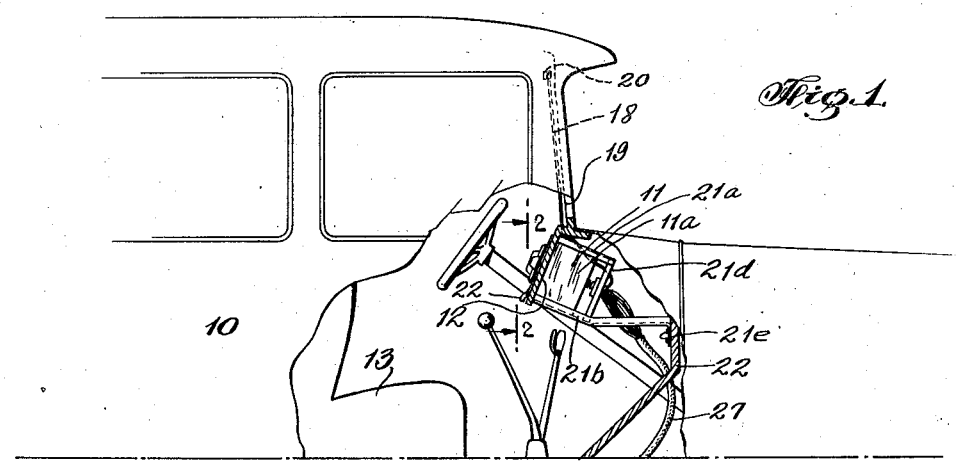
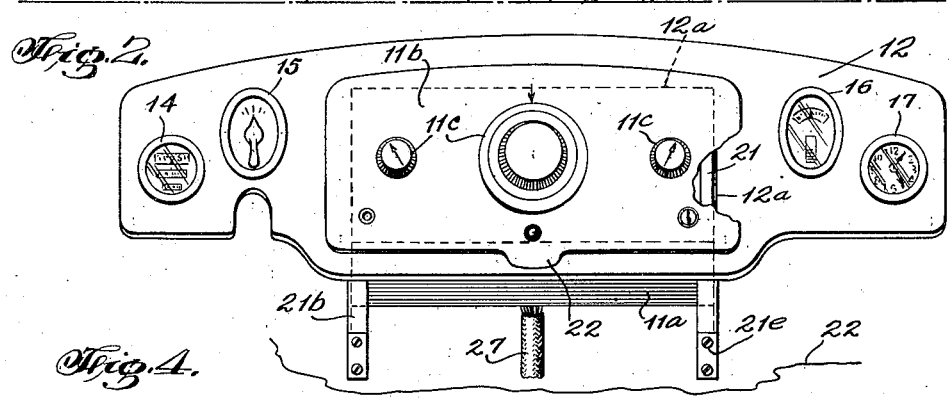
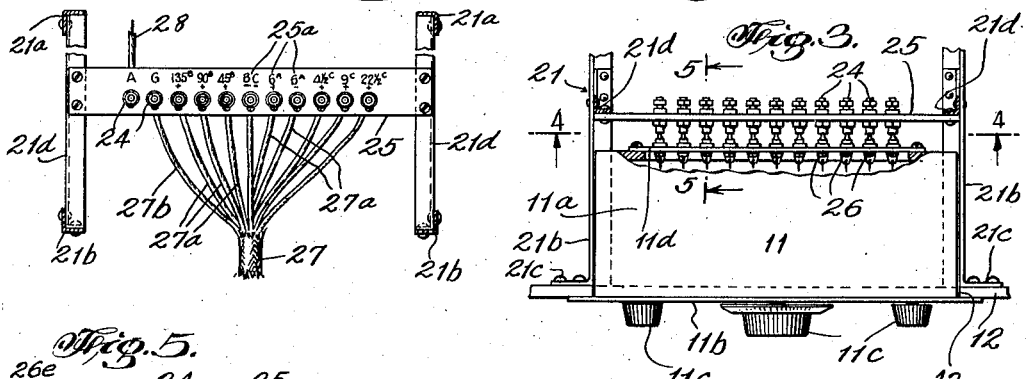
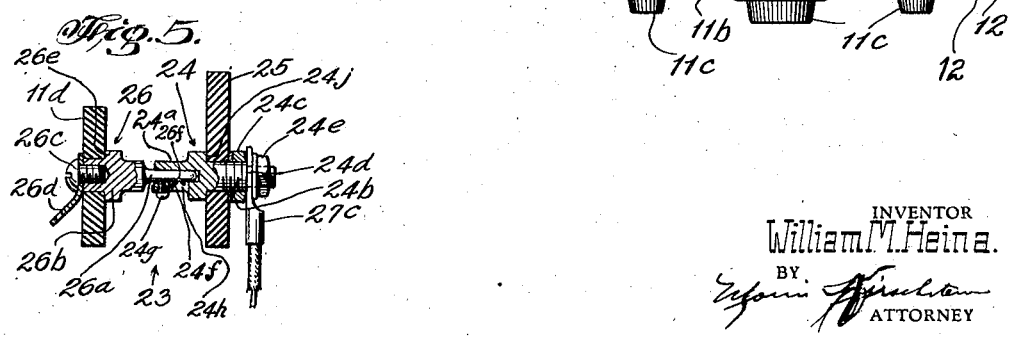
INVENTOR
William M. Heina.
BY
ATTORNEY Patented June 9, 1931

1,809,296

UNITED STATES PATENT OFFICE

WILLIAM M. HEINA, OF LONG ISLAND CITY, NEW YORK, ASSIGNOR, BY MESNE ASSIGNMENTS, TO TRANSITONE AUTOMOBILE RADIO CORPORATION, OF PHILADELPHIA, PENNSYLVANIA, A CORPORATION OF DELAWARE

PORTABLE RADIO APPARATUS

Application filed February 9, 1928. Serial No. 253,011.

This invention relates to improvements in portable radio apparatus.

One object of this invention is to provide portable radio apparatus such as a receiving set in the form of an installation in vehicles or the like, in which installation the apparatus is located conveniently for operation by the person in charge of the vehicle, and wherein the construction, location, and arrangement of the various parts of the radio apparatus permit of easy removability of said set and afford a high degree of efficiency in the operation of the set without marring the appearance of the car, or interfering with the ease and convenience of manipulating the various car mechanisms and devices.

Another object of the invention is to provide an installation of the character described, in which the receiving set is mounted for sliding movement toward and away from the dashboard of a vehicle to permit removal thereof for purposes of inspection and repair.

A still further object of the invention is to provide an installation of the character described, in which the receiving set is mounted for sliding movement toward and away from the dashboard of a vehicle, and wherein connection between the various batteries or other sources of current provided for the receiving set and the different parts thereof is readily made or broken coincident with the movement of the receiving set with respect to said dashboard, without the necessity of handling the connecting wires and related parts.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawings, in which is shown one of the various possible illustrative embodiments of this invention, Fig. 1 is a side elevational view of a closed type of passenger automobile, partly broken away to show a receiving set installation embodying the invention.

Fig. 2 is a front elevational view of the receiving set as mounted on the dashboard of said automobile, as seen in the direction of the arrows from line 2—2 of Fig. 1.

Fig. 3 is a view showing the mounting of the set which permits movement thereof, parts being broken away to disclose the means for connecting the sources of power to the set.

Fig. 4 is an elevational view of the stationary contacts, as seen from the line 4—4 of Fig. 3.

Fig. 5 is a sectional view on line 5—5 of Fig. 3, showing in detail an embodiment of the means for connecting sources of power to the set.

Referring in detail to the drawings, the improved portable radio apparatus is seen to comprise a radio receiving set indicated generally at 11, mounted on the dashboard 12 in front of the driver's seat 13 of a closed type of passenger automobile 10 of any particular construction. Said dashboard may be arranged to carry the various operating accessories of an automobile, such as the speedometer 14 and the ammeter 15 mounted at one side, and a combination oil and gasoline register 16 and a clock 17 at the other side. The receiving set 11, preferably housed in a casing 11$^a$ provided with a control panel 11$^b$, is mounted on the dashboard so that the operating knobs 11$^c$ on the control panel are within easy reach of the driver. An antenna 18 may be suitably mounted within the car body, as, for instance, adjacent the front wind-shield 19. A loudspeaker 20 may be conveniently positioned near the top of the car.

The radio apparatus is constructed to permit easy removal of the receiving set 11, as for purposes of inspection or the like. Accordingly, the dashboard is provided with a central opening 12$^a$ through which the receiving set is movable, said opening being normally closed by the control panel 11$^b$. Extending from the dashboard toward the front of automobile 10, and positioned around said opening, is a framework 21 constructed to provide guiding means for slidably receiving the casing 11ª permitting the receiving set to be moved inward or outward through opening 12ª in the manner of a drawer, under actuation of a finger-piece 22. The framework 21 comprises upper and lower guides 21ª and 21ᵇ formed by angle irons or the like, said guides receiving the longitudinal edge portions of casing 11ª. Said guides are secured to the dashboard 12 by any suitable fastening means 21ᶜ at one end of the framework; at the other end of the latter the said guides are spaced vertically from each other by means of the connecting angles 21ᵈ. In order to provide a brace for the entire framework 21, the guides 21ᵇ are preferably extended beyond angles 21ª and secured to the front wall 22 of the car body 10, being fastened thereto by any suitable fastening means 21ᵉ, thus providing a properly balanced supporting structure.

Connectors for linking the terminals of the receiving set with the terminals of power sources are provided and are so constructed that connections are made or broken coincident with the insertion or removal of the receiving set from the dashboard. Said connectors preferably comprise stationary terminal sockets 24 mounted on bar 25. Said bar may be made of insulating material, or, if desired, of metal. In the latter case, a customary means for insulating the individual sockets 24 from the bar 25 may be provided. Bar 25 is secured to aligned faces of angles 21ᵈ, thus providing a horizontal bracing means for guides 21ª, 21ᵇ, to keep the latter properly spaced. Plug members 26, aligned with sockets 24, are mounted on a support 11ᵈ, extending across the rear of casing 11ª and movable therewith. Said support may be the customary backboard of the casing or a bar of sufficient width to carrry the plug members 26. A conductor cable 27 for the set 11 is positioned behind the dashboard and comprises the battery wires 27ª leading from the terminals of the "A", "B", and "C" batteries, and also wire 27ᵇ connected to the frame of the car, or any other ground or counterpoise for the set, all of which wires are connected to the sockets 24 in accordance with the indicia 25ª on the bar 25. A wire 28 leading from the antenna 18 is connected with a socket 24 marked "A" on bar 25.

The sockets and plugs 24 and 26 can be constructed in any suitable manner within the scope of the invention. Preferably, however, each socket 24 includes a receiving portion 24ª, having a shoulder 24ʲ and a threaded end 24ᵇ. Said threaded end is passed through an opening in bar 25; then socket 24 is secured to bar 25 between nut 24ᶜ received on said threaded end 24ᵇ and shoulder 24ʲ. End 24ᵇ is undercut to provide the shoulder 24ᵈ against which the connecting lug 27ᶜ of the respective cable wire is received, any suitable fastening means as nut 24ᵉ securing said lug to said end. A spring 24ᶠ may be secured by a screw 24ᵍ to project through a slot 24ʰ into the bore of the socket to frictionally contact the end 26ª of the plug member 26 and engage with a notch 26ᶠ therein. Said end 26ª may be formed on a head 26ᵇ passing through support 11ᵈ and positioned with respect to the latter by the shoulder 26ᶜ. Screw 26ᶜ, engaging the conventional connection lugs 26ᵈ which in turn abuts a surface of support 11ᵈ, provides means for securing the plug 26 to said support. It will now be clear that the set 11 can be readily removed for inspection or repair without disturbing the wire connections.

The receiving set 11 is retained in proper position against undesired release from the frame 21 through the frictional engagement of the terminal connectors, combined with the effect of the inward and downward inclination of said framework, as clearly shown in Fig. 1. However, when it is necessary to remove the set, this may be readily accomplished by simply pulling on handle 22 of the control panel.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

In combination with a dashboard of a vehicle, a radio apparatus comprising a radio set including a casing insertable in an opening formed through said dashboard; guide means, positioned in rear of said dashboard, for permitting inward and outward movements of said set through said dashboard opening; terminals permanently positioned at the back of the dashboard and connected to power sources, and other terminals mounted on said casing and respectively engaging said first terminals upon movement of said casing to its inner position within the dashboard, said first and second terminals contacting frictionally whereby connection therebetween is broken coincident to an outward movement of said set, and said guide means being inclined to insure said set and cooperating terminals against accidental release.

In testimony whereof I affix my signature.

WILLIAM M. HEINA.